(12) United States Patent
Boursier

(10) Patent No.: US 8,997,974 B2
(45) Date of Patent: Apr. 7, 2015

(54) TRANSVERSELY DEFORMABLE ENDLESS CONVEYOR BELT FOR A CONVEYOR DEVICE

(75) Inventor: Marcel Boursier, Saint-Colomban (FR)

(73) Assignee: Liftvrac, Saint Colomban (FR)

( * ) Notice: Subject to any disclaimer, the term of this patent is extended or adjusted under 35 U.S.C. 154(b) by 712 days.

(21) Appl. No.: 13/255,355

(22) PCT Filed: Mar. 10, 2010

(86) PCT No.: PCT/FR2010/050412
§ 371 (c)(1),
(2), (4) Date: Sep. 8, 2011

(87) PCT Pub. No.: WO2010/103238
PCT Pub. Date: Sep. 16, 2010

(65) Prior Publication Data
US 2012/0000751 A1 Jan. 5, 2012

(30) Foreign Application Priority Data
Mar. 10, 2009 (FR) ...................................... 09 01102

(51) Int. Cl.
*B65G 15/08* (2006.01)
*B65G 15/36* (2006.01)
*B65G 15/40* (2006.01)

(52) U.S. Cl.
CPC ................ *B65G 15/36* (2013.01); *B65G 15/08* (2013.01); *B65G 15/40* (2013.01); *B65G 2812/02207* (2013.01)

(58) Field of Classification Search
CPC ........ B65G 15/08; B65G 15/36; B65G 15/40; B65G 2812/02207
See application file for complete search history.

(56) References Cited

U.S. PATENT DOCUMENTS 3,338,383 A * 8/1967 Hashimoto .................... 198/819
3,630,340 A * 12/1971 Bouzat et al. ................. 198/847
4,061,223 A * 12/1977 McGinnis ..................... 198/821
(Continued)

FOREIGN PATENT DOCUMENTS

DE     1 939 381 A1    2/1971
GB        461 162 A    2/1937
WO    90/03930 A1    4/1990

OTHER PUBLICATIONS

International Search Report, dated May 31, 2010, from corresponding PCT application.

*Primary Examiner* — Gene Crawford
*Assistant Examiner* — Thomas Randazzo
(74) *Attorney, Agent, or Firm* — Young & Thompson

(57) ABSTRACT

An endless conveyor belt for a conveyor device, includes a planar body (2) that is transversely deformable into a tubular configuration, the body having a plurality of longitudinal reinforcing members built into the body thereof. The body has an upper layer (10), a portion of the lower surface of which is combined with a lower layer (11). The two layers are made of two different elastomer materials, with the lower layer made of a first elastomer material, whose hardness is greater than that of the second elastomer material constituting the upper layer, and the lower layer includes a plurality of softening recesses (13) that are distributed across the entire length of the lower layer and each of which extend over at least a portion of the body thereof so as to reduce the resistance thereof to longitudinal deformations in order to reduce the resistance to the bending of the conveyor belt into the tubular configuration thereof.

19 Claims, 3 Drawing Sheets

(56) References Cited

U.S. PATENT DOCUMENTS

| | | | |
|---|---|---|---|
| 4,526,272 A * | 7/1985 | Peterson | 198/819 |
| 4,809,844 A * | 3/1989 | Hashimoto et al. | 198/819 |
| 5,232,084 A * | 8/1993 | Simonsen et al. | 198/819 |
| 5,351,810 A * | 10/1994 | Tingskog | 198/819 |
| 7,004,311 B2 * | 2/2006 | Fatato et al. | 198/849 |
| 7,124,879 B1 * | 10/2006 | Maguire | 198/690.2 |
| 7,261,203 B2 * | 8/2007 | Mindich | 198/819 |
| 7,942,259 B2 * | 5/2011 | Steven et al. | 198/819 |
| 2002/0175055 A1 * | 11/2002 | Ryde | 198/847 |
| 2011/0114455 A1 * | 5/2011 | Boursier | 198/832 |

* cited by examiner

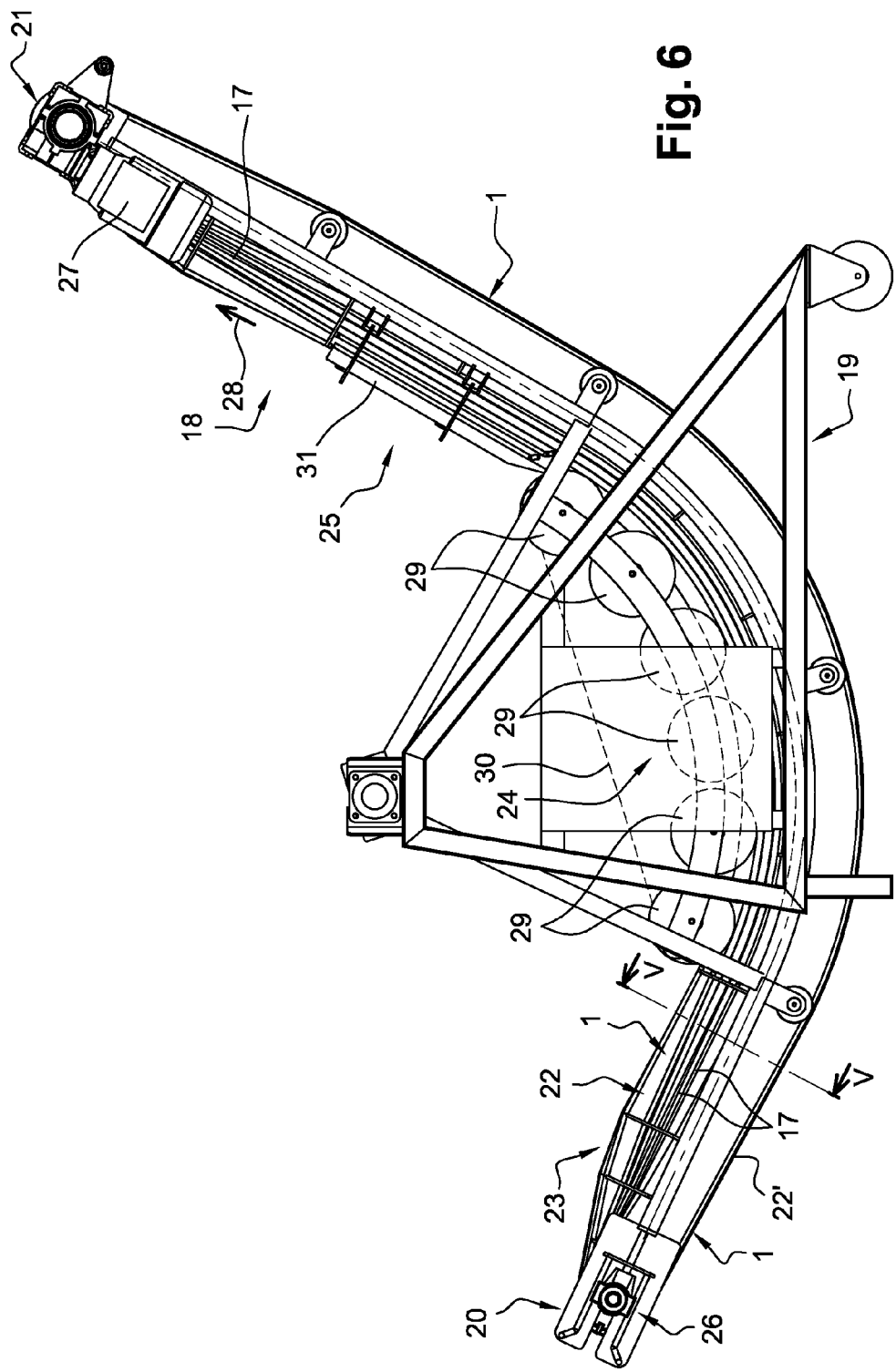

TRANSVERSELY DEFORMABLE ENDLESS CONVEYOR BELT FOR A CONVEYOR DEVICE

BACKGROUND OF THE INVENTION

The present invention relates to the general field of installations for conveying products by endless conveyor belts. It more particularly relates to the endless conveyor belts of which the flat body, at rest, can be deformed transversely into a tubular configuration.

DESCRIPTION OF THE RELATED ART

The installations for conveying products, in particular foodstuffs, may be fitted with at least one endless conveyor belt comprising a body made of a flexible material which incorporates in its thickness a plurality of longitudinal reinforcing members (cables, flat webbing, etc.) suitable for limiting its ability to stretch longitudinally.

Some of these conveyor belts have a flat configuration, at rest, which is useful for the loading and releasing of the products; they can also be deformed transversely into a tubular, or at least substantially tubular, configuration in order to form a kind of trough or tube suitable in particular for conveying products in an upward direction.

In order to work optimally, the body of these deformable conveyor belts is made of a material that has to satisfy various opposing requirements: the top face, designed to receive the products to be conveyed, must have a sufficiently high coefficient of friction for an optimal adherence of the products, while, on the other hand, the bottom face must have a minimal coefficient of friction in order to limit the friction phenomena on the means for driving and guiding the associated conveying device.

These belts must also tolerate a certain bending at least when they are formed into troughs or tubes, so as to be able to follow nonrectilinear trajectories (with angles or curves) within the conveying device.

However, in practice, the coefficient of friction of a flexible material is notably a function of its hardness level: a material which is quite hard usually has a reduced coefficient of friction and conversely a material which is quite soft normally has a high coefficient of friction.

Similarly, a material which is quite hard has a higher resistance to deformations, capable of increasing its resistance to bending.

For these reasons, the conventional practice is to make the conveyor belts out of a single flexible material which is chosen with hardness characteristics having an optimal compromise between all the operating requirements.

However, the conveyor belts thus obtained do not make it possible to comply with each requirement in an optimal manner.

SUMMARY OF THE INVENTION

The applicant has developed a new conveyor belt structure designed to more effectively satisfy all of these requirements, that is to say to provide optimal conveyance of the products while generating reduced friction with the driving and guiding means of the associated conveying device.

In addition, this conveyor belt has the advantage of having a reduced resistance to bending, so as to be able to effectively follow the nonrectilinear trajectories imposed by the conveying device, that without risk of damage, or at least with such risks being limited.

Accordingly, the endless conveyor belt according to the invention comprises a body that can be deformed transversely between—a flat configuration at rest, and—a tubular or at least substantially tubular configuration, which body incorporates in its thickness a plurality of longitudinal reinforcing members suitable for limiting its ability to stretch longitudinally, and which body is delimited by two faces: one top face designed to receive the product to be conveyed, and one bottom face designed to interact with driving and guiding means constituting said conveying device, said top face and bottom face being designed to be oriented respectively toward the inside and the outside of the conveyor belt in said tubular configuration. And this conveyor belt is characterized by the fact that its body consists of an upper layer forming said top face, in which at least a portion of its lower surface is associated with a lower layer forming the bottom face of the body. Moreover, the two layers in question are made of two different elastomer materials, with said lower layer made of a first elastomer material the hardness of which is greater than that of the second elastomer material constituting said upper layer (this gives a body of which the top face has a higher coefficient of friction than the bottom face; in operation, the bottom face then generates little friction on the driving and guiding means constituting the conveying device, and the top face provides an effective driving of the products). Moreover, the lower layer, also advantageously, comprises, distributed over the whole of its length, a plurality of softening recesses each extending over at least a portion of its thickness, in order to reduce (or even eliminate) its resistance to the longitudinal deformations (in tension and in compression), in order to reduce the flexing or bending resistance of the conveyor belt which is in its tubular configuration.

Other advantageous features of the invention, which can be taken in combination or in isolation from one another, are explained below:

- the softening recesses of the lower layer extend transversely relative to the longitudinal axis of the body of the conveyor belt; in this case, these softening recesses preferably have a rectilinear elongate shape, and they extend along an axis oriented perpendicularly, or at least substantially perpendicularly, relative to the longitudinal axis of the body of said conveyor belt;
- the softening recesses extend into the whole thickness of the lower layer, and optionally over a portion of the thickness of the upper layer;
- the reinforcing members are embedded in the thickness of the lower layer and/or are situated at the interface between the upper layer and lower layer;
- the softening recesses extend beyond the space occupied by the reinforcing members;
- the conveyor belt comprises two groups of a plurality of parallel longitudinal reinforcing members, each being situated at ¼, or approximately ¼, of the width of the belt body, relative to one of the edges of said body; and the lower layer comprises, over its length, a plurality of groups of three softening recesses: (i) one central softening recess, located between the two groups of longitudinal reinforcing members, and (ii) two outer softening recesses, extending between one of the groups of reinforcing members and said body edge nearby (the lower layer then forms a kind of framework or mesh in order to provide an optimal support for the conveyor belt in tubular configuration, thus limiting the risks of collapse);
- the upper layer comprises, on its lower face, two protruding one-piece lateral strips, extending on either side of the lower layer; and the transverse softening recesses extend beyond the space occupied by said lateral strips or only over a portion of their width;

the ratio of the thicknesses between the upper and lower layers is between 0.3 and 2 (preferably 0.7);

the conveyor belt comprises protruding studs made in one piece in the lower layer which serve to guide and drive the belt, which studs are evenly distributed over the bottom face of the belt, the softening recesses being made beyond the transverse space occupied by said one-piece studs;

the lower layer also comprises longitudinal recesses, oriented parallel to or at least substantially parallel to the longitudinal axis of the belt body, which recesses are made in the thickness of said lower layer and open at the lower face of said belt body, so as to reduce the resistance of said lower layer to the transverse deformation in order to make it easier to place the conveyor belt in tubular configuration.

BRIEF DESCRIPTION OF THE DRAWING FIGURES

The invention will also be illustrated, without in any way being limited, by the following description of a particular embodiment, given only as an example and shown in the appended drawings in which:

FIG. 6 is a side view of a conveying installation, in the form of an elevator-conveyor, using the conveyor belt illustrated in FIGS. 1 to 5.

Figure 1:
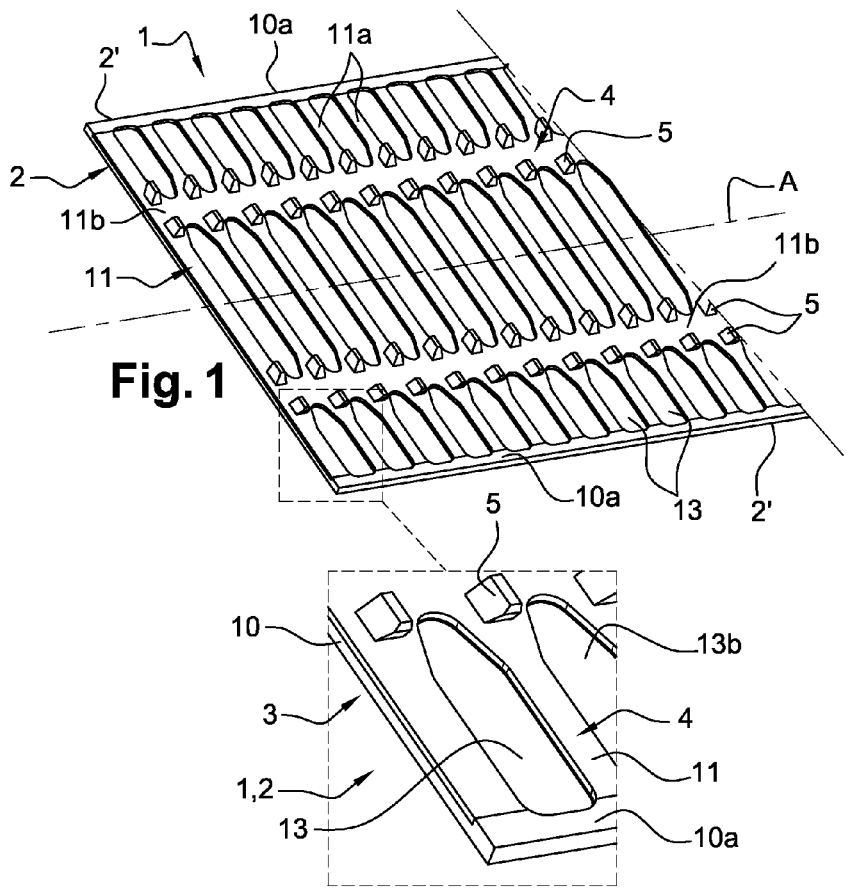
FIG. 1 shows a section of the endless conveyor belt according to a view in perspective oriented from the side of its bottom face.

The conveyor belt 1, illustrated in FIGS. 1 to 4, is suitable for conveying products, notably foodstuffs.

It is designed to equip, for example, a conveying installation as described below with reference to FIG. 6.

DETAILED DESCRIPTION OF THE INVENTION

This conveyor belt 1 comprises a flat body 2 made of flexible material.

This flat body 2, with a longitudinal median axis of symmetry A, has an elongate rectangular section. As an indication, its constant width L (FIG. 2) is in this instance between a few centimeters and a few tens of centimeters; its general thickness E (FIG. 3) is of the order of a few millimeters.

This belt body 2 has two opposite faces: a top face 3 and a bottom face 4.

The top face 3 of the belt body 2 is designed to receive the products to be conveyed. It is smooth and contains no protuberances (FIGS. 3 and 4).

Its bottom face 4 is designed to interact with the guiding and driving means of the conveying installation. For this it comprises notably a plurality of studs 5 which are notably suitable for interacting with a motorized transmission structure driving the conveyor belt 1.

Figure 2:
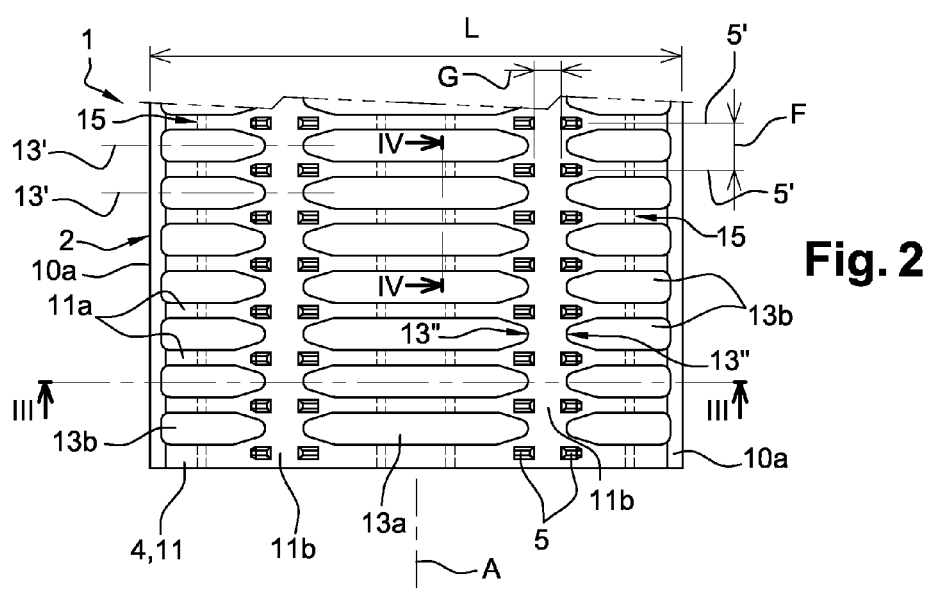
FIG. 2 is an elevation view of the endless conveyor belt of FIG. 1, seen from the side of its bottom face.

The one-piece studs 5 are in this instance distributed along transverse lines 5', evenly spaced apart by a distance F, for example of a few centimeters (FIG. 2).

Figure 3:
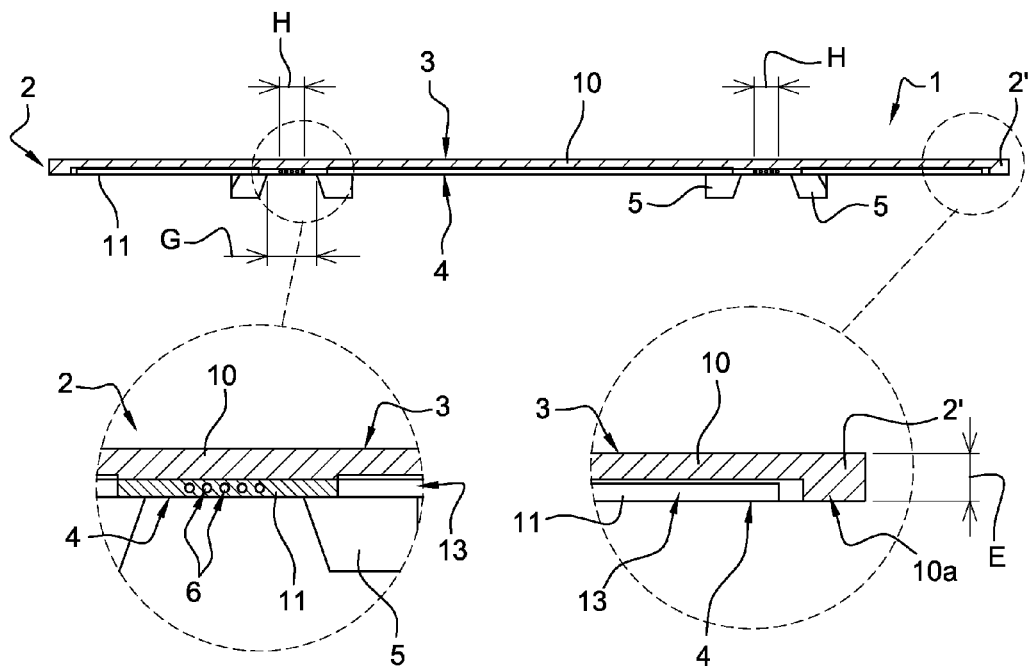
FIG. 3 is a view in section, along the transverse sectional plane III-III of FIG. 2.
Figure 4:
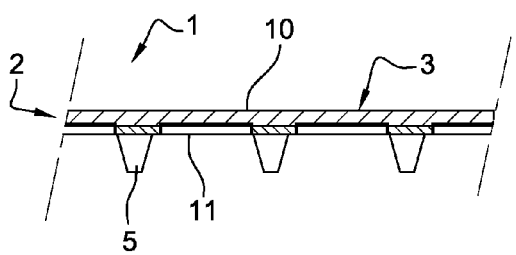
FIG. 4 is, for its part, a view along a longitudinal sectional plane IV-IV of FIG. 2.

As illustrated in FIGS. 2 and 3, these studs 5 are four in number on each transverse line 5'; and they are placed in pairs, in a symmetrical manner relative to the median axis A of the body 2.

Each pair of studs 5 is approximately centered half way across the width of the belt 2. Within each pair, the one-piece studs 5 are spaced at a distance G from one another.

The conveyor belt 1 further comprises longitudinal reinforcing members 6, in the form of cables or of flat webbing, suitable for limiting its ability to stretch longitudinally (FIG. 3).

These reinforcing members 6, made for example of aramide fibers or steel wires, are embedded in the mass during the manufacture of the belt 1, at its pitch line.

According to the present invention, the structure of the conveyor belt 1 is adapted so as to carry out simultaneously, on the one hand, an effective driving of the conveyed products and, on the other hand, an optimal interaction by direct contact with the driving/guiding means constituting the conveying installation.

For this, the belt body 2 comprises in particular a top face 3 the coefficient of friction of which is greater than that of the bottom face 4.

In order to provide these differences in coefficient, the thickness of the belt body 2 consists in this instance of two superposed layers fixed one onto the other: an upper layer 10 forming the top face 3, and of which at least a portion of its lower surface is associated with a lower layer 11 forming the bottom face 4 of the body 2.

These two layers 10, 11 are made of elastomer materials that differ from one another: the lower layer 11 is made in a first elastomer material the hardness of which is greater than that of the second elastomer material forming the upper layer 10.

The materials constituting each of these layers 10 and 11 may be chosen as required, as a function notably of the coefficients of friction that are sought.

For example, the upper layer 10 has a thickness of between 2 and 5 mm; it is advantageously made of a material which is quite soft, having a Shore A type of between 60 and 80 Shore A.

The lower layer 11 may, for its part, have a thickness of between 1 and 4 mm; the material it consists of is advantageously chosen from those considered to be quite hard, having a Shore D type of between 40 and 75 Shore D.

The belt body 2 is advantageously manufactured using a co-extrusion or post-extrusion technique from elastomer materials of the polyurethane type.

As illustrated by FIG. 3, the reinforcing members 6 are embedded in the thickness of the lower layer 11, in the middle or at least approximately in the middle of its thickness (that is to say again at the pitch line of the flat body 2, as touched upon above).

These reinforcing members 6 are grouped in two zones of width H of the flat body 2 which are situated at ¼, or approximately at ¼, of its width L on either side of the mid-plane A (that is to say approximately centered half way across the width of the flat body 2).

Each group of reinforcing members 6 is therefore also situated at ¼, or approximately at ¼, of the width L of the body 2, relative to one of the edges 2' of said body 2.

A reinforcing member 6 may be present on each zone in question (in the form of cable or of flat webbing). If cables are used, preferably two groups of a plurality of reinforcing members 6 are provided (advantageously between 2 and 6 reinforcing members per group).

These groups of reinforcing members 6 are each positioned in a narrow zone of the width of the flat body 2; the width H of this zone is for example between 2 and 5 mm.

In FIG. 3, we note also that the groups of reinforcing members 6 are each positioned in one of the zones G of the flat body 2 situated between the studs 5, and that they are centered on this zone G.

The reinforcing members 6 consist in this instance of cables, five in each group. The cables in question advantageously consist of cables of aramide fibers having a section with a diameter of between 0.5 and 1.5 mm.

Moreover, the lower layer 11 of the belt 1 is structured so as to reduce, or even eliminate, its resistance to the longitudinal deformations and to the stresses (in compression and in tension); or in other words, it is structured so as to provide increased characteristics of elasticity and to bring flexibility to this lower layer 11.

More precisely, it is the unreinforced portions of the lower layer 11, that is to say located beyond the transverse space occupied by the reinforcing members 6, which advantageously have improved elasticity and flexibility.

This characteristic is designed in particular to reduce resistance to flexing, or in other words to bending, of the conveyor belt 1 at least in its tubular configuration, which is particularly useful during a nonlinear travel of this conveyor belt in the conveying installation.

Accordingly, as illustrated in FIGS. 1 to 4, this lower layer 11 has a discontinuous structure because of the presence of a plurality of softening recesses 13, appropriately arranged and shaped, made for example by machining.

These recesses 13 are structured in order to limit, or even eliminate, the longitudinal deformations and the stresses of the lower layer 11 (in tension and in compression), in the stress zones generated during the bending of the conveyor belt 1 previously shaped into a tube, about a transverse axis passing through the two groups of reinforcing members 6.

The corresponding softening recesses 13 each extend in this instance into the whole thickness of the lower layer 11, and open at the lower face 4 of the body 2.

As shown in FIG. 3, these recesses 13 also extend very slightly into the thickness of the upper layer 10 (this upper layer 10 in this instance forms the bottom of these recesses 13).

These recesses 13 are shaped and distributed so that the lower layer 11 forms a sort of framework or mesh consisting of several strips of material: a plurality of regularly spaced transverse strips 11a, extending over the whole width of the belt body 2 (perpendicularly to its longitudinal axis A) and interspersed with two longitudinal strips 11b located at a distance from each other (parallel to its longitudinal axis A).

The corresponding longitudinal strips 11b incorporate the reinforcing members 6; they are situated at ¼ of its width L, or approximately at ¼, on either side of the mid-plane A (that is to say approximately centered half way across the width of the flat body 2).

The studs 5 are situated at the points of intersection between these transverse strips 11a and longitudinal strips 11b.

As an indication, the longitudinal strips 11b have a width of between 10 and 20 mm; the transverse strips 11a have a width of between 10 and 15 mm.

Accordingly, the softening recesses 13 each have an elongate and rectilinear shape, of the oblong type; they extend transversely relative to the longitudinal axis A of the belt body 2, in this instance along an axis oriented perpendicularly to this longitudinal axis A.

These transverse recesses 13 are provided on only a portion of the width of the lower layer 11, beyond the space occupied by the reinforcing members 6.

They are distributed over transverse lines 13' that are evenly spaced, delimiting between them the transverse strips 11a (FIG. 2).

Each transverse line 13' comprises one group of three recesses, separated by the two longitudinal strips 11b, namely:

a central recess 13a situated between the two longitudinal strips 11b (that is to say again between the two groups of longitudinal reinforcing members 6), and two outer recesses 13b extending between one of the longitudinal strips 11b (or one of the groups of reinforcing members 6) and one of the body edges 2' nearby.

The recesses 13 are also situated beyond the transverse space occupied by the one-piece studs 5; they are therefore situated in the longitudinal space F separating two longitudinally juxtaposed studs 5.

The transverse recesses 13 also terminate as close as possible to the reinforcing members 6, so as to optimize the flexing and bending characteristics of the conveyor belt 1.

On the side of the reinforcing members 6, these recesses 13 in this instance comprise an end 13" that is generally V-shaped which extends over a portion of the width of the longitudinal strips 11b between two longitudinally juxtaposed studs 5.

As an indication, the distance between the end 13" of a transverse recess 13 and the reinforcing members 6 is advantageously a few mm.

As shown in FIGS. 1 to 3, the upper layer 10 comprises two protruding one-piece lateral strips 10a, which form extensions extending on either side of the lower layer 11.

The function of these lateral strips 10a is to help to keep the conveyor belt 1 in its flat and tubular configurations; they also provide an optimal seal when they are joined one against the other.

They cover the lateral edges of the lower layer 11 of the belt 1 and their lower face extends in the same general plane as the lower face 4 of said lower layer 11.

The outer transverse recesses 13b encroach into a minimal portion of the width of these lateral strips 10a.

Furthermore, the lower layer 11 advantageously also comprises longitudinal recesses 15 shown schematically in FIG. 2 (in dashed lines).

These longitudinal recesses 15 are oriented parallel to or at least substantially parallel to the longitudinal axis A of the body 2.

They are made in the thickness of the lower layer 11, on the transverse strips 11a, so as to reduce the resistance of this lower layer 11 to the transverse deformation. Moreover, they open at the lower face 4.

This feature is useful, while being optional, for making it easier to place the conveyor belt 1 in tubular configuration.

Figure 5:
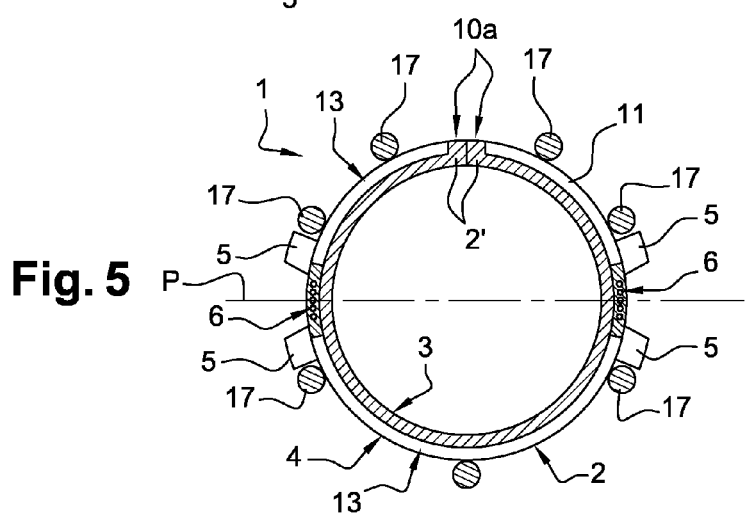
FIG. 5 shows the endless belt of FIGS. 1 to 4, placed in tubular configuration (along a sectional plane V-V of the installation illustrated in FIG. 6)

Because of its transverse flexibility, the conveyor belt 1 can be formed at least into a trough (for example with a section that is at least generally U-shaped); it may, in a more advanced manner, be placed in a tubular or practically tubular transverse configuration, with its raised edges 2' that join or practically join one another, as illustrated in FIG. 5. The two longitudinal edges 2' of the belt 1 are raised in an identical manner in order to obtain a structure that is symmetrical relative to a vertical mid-plane.

In such a tubular transverse configuration, the top face 3 and bottom face 4 have a circular conformation and they are oriented respectively toward the inside and outside of the formed tube.

The longitudinal reinforcing members 6 are positioned on the horizontal diameter P of the transverse section of the tube, which makes it possible to limit to the maximum the internal stresses of the conveyor belt 1. This is in particular the case when the belt in tubular configuration is curved so as to move along nonrectilinear trajectories (angled or curved), in a plane perpendicular to the axes of the end rollers of the fitted conveying structure.

Moreover and as indicated above, the softening recesses 13 allow to reduce the stresses on the lower layer 11 in the context of these nonrectilinear trajectories: on the one hand, the compression stresses are reduced for the portion of the lower layer 11 situated above the plane P (on the side of the belt edges 2') and oriented toward the inside of the bend, and, on the other hand, the tension/stretching stresses are reduced for the portion of the lower layer 11 situated beneath the plane P (opposite to the belt edges 2') and coming to the outside of the bend.

The bending characteristics of the flexible belt 1 then correspond substantially to the characteristics of the upper layer 10 made of quite soft material, more suited to sustaining these longitudinal deformations.

Still in this tubular configuration, the lower layer 11, forming the outer framework, helps to maintain the volume of the conveyor belt 1 and thus reduces the risks of it collapsing.

FIG. 5 shows this placing in tubular transverse configuration of the conveyor belt 1, kept by means of the longitudinal guiding members 17 suitably arranged (forming the conveying installation).

These longitudinal guiding members 17 may consist of round-section metal wires (as illustrated in FIG. 5); they may also be rails or section pieces made of metal or plastic, for example of HDPE.

Note here that some guiding members 17 rest on the sides of the one-piece studs 5 in order to prevent the lateral (or rotational) movement of the endless belt 1, when it moves.

The lower layer 11 of the belt 1 is moved along by direct contact on these guiding members 17, for example by sliding.

This lower layer 11 and the associated one-piece studs 5, made of rigid material and with a low coefficient of friction, generate limited friction which reduces the risks of damage to the belt 1 and the associated installation.

This tubular transverse configuration can be used for example in the context of an elevator-conveyor in order to optimize the carriage of the products, in particular at the ascending section or sections.

An example of such an elevator-conveyor 18 is shown in FIG. 6.

This elevator-conveyor 18 comprises a frame 19 fitted with the endless conveyor belt 1 which is wound, upstream, around a lower transmission structure 20 and, downstream, around an upper transmission structure 21, both in the form of end rollers.

The endless belt 1 comprises—an upper strand 22, of which the upper face 3 forms the surface for conveying the products, and—a lower strand 22' forming the return strand.

The upper strand 22 of the endless belt 1 is guided by the frame 19 so as to define, starting from the upstream roller 20, successively—a rectilinear loading section 23 for the conveyed products, —a concave curved section 24, —a rectilinear ascending section 25 which terminates at the downstream end roller 21.

As touched upon above, the particular structure of the conveyor belt 1 allows it to be bent effectively at the concave section 24 with reduced stresses.

The elevator-conveyor 18 comprises conventional means 26 which make it possible to tension and slacken the endless belt 1, said means being arranged here at the upstream roller 20.

The downstream roller 21 is associated with a drive 27 which allow its rotation in order to provide the driving of the endless belt 1 in the direction of the directional arrow 28.

At the end rollers 20 and 21, the endless belt 1 has a flat or substantially flat transverse configuration as shown in FIG. 3.

However, between its upstream end 20 and downstream end 21, the elevator-conveyor 18 is structured in order to form the conveyor belt 1 into a curved configuration and more particularly into a tubular configuration, at least over a portion of the ascending section 25 (and preferably over a portion at least of the curved section 24 and over the majority of the length of the ascending section 25), then making use of its transverse flexibility characteristics in order to optimize the ascending conveyance of the products.

At the loading section 23, the endless belt 1 has a flat configuration, suitable for allowing the products to be placed on it, for example by means of a hopper (not shown).

This loading section 23 may be structured in a down slope, as illustrated in FIG. 6; in variant embodiments, the corresponding downslope may be less pronounced. The loading section 23 may also extend horizontally or with a slight upslope, in particular depending on the nature of the products to be conveyed.

The placing of the endless belt 1 in curved configuration, with its longitudinal edges 2' raised toward one another, is initiated at the loading section 23 or just after the latter, by means of the aforementioned longitudinal guiding members 17 which rest against the bottom face 4 of said endless belt 1 (FIG. 5).

In the embodiment illustrated, the tubular configuration of the endless belt 1 is obtained approximately at the end of the loading section 23, that is to say approximately at the beginning of the curved section 24, and it extends as high as possible on the ascending section 25, that is to say just before the downstream end 21. The belt section illustrated in FIG. 5 may correspond to the section along the plane V-V of FIG. 6.

Upstream of the complete tubular configuration, the guiding members 17 progressively deform the endless belt 1 in order to move from the flat transverse configuration (at the end roller 20) to the tubular configuration (while preserving a suitable space for the loading of the products).

Downstream of the complete tubular configuration, the guiding members 17 progressively deform the endless belt 1 in order to move from said tubular configuration to a flat configuration (at the end roller 21).

The tubular conveying configuration may be obtained by the guiding members 17 alone.

Nevertheless, preferably these guiding members 17 are associated with complementary means (schematized and referenced 29, 30 and 31 in FIG. 6), suitable for keeping the longitudinal edges 2' of the endless belt 1 joined or practically joined, in order to obtain or to reinforce the seal at the upper generatrix of the obtained tube.

All these guiding means interact with the bottom face 4 of the conveyor belt 1 which has the value of having a reduced coefficient of friction.

At the curved section 24 of the elevator-conveyor 18, these complementary means comprise in this instance a set of roller wheels 29 mounted so as to rotate freely and juxtaposed on a line in an arc of a circle above the conveying tube 1. These roller wheels 29 have an active surface with a concave circularly arcuate section, matching the tubular belt section; they are distributed one after the other so as to come into contact with the tubular portion of endless belt 1 at the line of junction of its joined or practically joined edges.

In order to obtain a continuous pressure and optimize the seal, the juxtaposition of the roller wheels 29 is advantageously associated with a flexible endless belt 30 that surrounds them. The upper (inactive) strand of this endless belt 30 appears in FIG. 6. Its lower strand continuously presses on the conveying tube 1 in order to ensure the desired seal. It travels at the same speed or substantially the same speed as the conveying tube 1, driven by the latter.

Alternatively, the guiding means at the curved section 24 could be only of the slide rail type.

At the rectilinear ascending section 25 of the elevator-conveyor 18, the complementary means for keeping the longitudinal edges of the endless belt joined or practically joined consist of fixed pressure skids 31, the active surface of which has a concave circularly arcuate section, matching the upper section of the conveying tube.

In the zones of presence of the complementary means 29-30, 31 which press on the upper portion of the conveying tube 1, the longitudinal guiding members 17 can be provided solely to guide the lower portion and optionally the lateral portions of said conveying tube 1.

At the curved section 24 of the elevator-conveyor, it is also possible to provide means in the form of lateral pressure rails and/or in the form of a lower tensioning member or members, suitable for preventing the conveying tube 1 from collapsing on itself.

This collapse is also limited or prevented by the peripheral framework created by the "hard" lower layer 11 of the belt body 2.

In operation, the endless conveyor belt 1 being driven by the motorized drum 21, the products can be deposited on the loading section 23. They are then channeled progressively in the tubular portion of the curve section 24; the structural features of the lower layer 11 are put to use so as to obtain an optimal bending of the belt 1 in tubular configuration. The products accumulate in the upstream portion of the ascending section 25 and they are conveyed upward to the downstream portion of the conveyor, under the effect of the high coefficient of the top face 3 of the belt 1, of the movement of this belt 1, of its conformation into a tube and of the pressure of the upstream products.

Arriving at the downstream transmission structure 21, the products are collected by any appropriate structure such as a receiving hopper, a transport conveyor, an outlet spout or other element.

Such an elevator-conveyor structure is very simple and particularly effective; the slope of the ascending section 25 can reach 60, 80, or even 100%, which confers upon it very worthwhile characteristics of compactness. Since the endless belt 1 has a smooth upper surface 3, it can easily be cleaned, for example by scraping means arranged at a portion with a flat configuration (for example at its ends or its lower return strand 22').

Moreover, the particular positioning of the reinforcing members 6 and the particular structure of the lower layer 11 prevent any internal stress on the structure of the endless belt configured in a tube, in particular at the curved section 24.

This type of elevator-conveyor can effectively be used for the upslope conveyance of bulk products in the form of portions, pieces, strips, grains, powder, etc. It finds an application in particular for food products such as meat in pieces, grated cheese or vegetables, and fish which is whole or in pieces.

The invention claimed is:

1. Endless conveyor belt for a conveying device (18), which conveyor belt (1) comprises a body (2) that can be deformed transversely between—a flat configuration, at rest, and—a tubular or at least substantially tubular configuration, which body (2) incorporates in its thickness a plurality of longitudinal reinforcing members (6) suitable for limiting its ability to stretch longitudinally, and which body (2) is delimited by two faces: —one top face (3) designed to receive the product to be conveyed, and—one bottom face (4) designed to interact with driving and guiding means (17, 29, 30, 31) constituting said conveying device (18), said top face (3) and bottom face (4) being designed to be oriented respectively toward the inside and the outside of the conveyor belt (1) in said tubular configuration, characterized in that said body (2) consists of an upper layer (10) forming said top face (3), in which at least a portion of its lower surface is superimposed fixed to a lower layer (11) forming said bottom body face (4), in that said two layers (10, 11) are made of two different elastomer materials, with said lower layer (11) made of a first elastomer material the hardness of which is greater than that of the second elastomer material constituting said upper layer (10) with a coefficient of friction of said top face (3) being greater than a coefficient of friction of said bottom face (4), and in that said lower layer (11) comprises, distributed over the whole of its length, a plurality of softening recesses (13) each extending over at least a portion of its thickness, in order to reduce its resistance to the longitudinal deformations in order to reduce the bending resistance of said conveyor belt (1) in its tubular configuration.

2. Endless conveyor belt according to claim 1, characterized in that the softening recesses (13) of the lower layer (11) extend transversely relative to the longitudinal axis (A) of the body (2) of said conveyor belt (1).

3. Endless conveyor belt according to claim 2, characterized in that the softening recesses (13) of the lower layer (11) have a rectilinear elongate shape, and extend along an axis (13') oriented perpendicularly, or at least substantially perpendicularly, to the longitudinal axis (A) of the body (2) of said conveyor belt (1).

4. Endless conveyor belt according to claim 1, characterized in that the softening recesses (13) extend into the whole thickness of the lower layer (11), and optionally over a portion of the thickness of the upper layer (10).

5. Endless conveyor belt according to claim 1, characterized in that the reinforcing members (6) are embedded in the thickness of the lower layer (11) and/or are situated at the interface between the upper layer (10) and lower layer (11).

6. Endless conveyor belt according to claim 1, characterized in that the softening recesses (13) extend beyond the space occupied by the reinforcing members (6).

7. Endless conveyor belt according to claim 1, characterized in that it comprises two groups of a plurality of parallel longitudinal reinforcing members (6), each being situated at ¼, or approximately ¼, of the width (L) of the body (2), relative to one of the edges (2') of said body (2), and in that the lower layer (11) comprises, over its length, a plurality of groups of three softening recesses: —one central softening recess (13a), situated between the two groups of longitudinal reinforcing members (6), and—two outer softening recesses (13b), extending between one of the groups of reinforcing members (6) and said body edge (2') nearby.

8. Endless conveyor belt according to claim 1, characterized in that the upper layer (10) comprises, on its lower face, two protruding one-piece lateral strips (10a), extending on either side of the lower layer (11), and in that the transverse softening recesses (13) extend beyond the space occupied by said lateral strips (10a) or only over a portion of their width.

9. Endless conveyor belt according to claim 1, characterized in that it comprises protruding studs (5) made in one piece in the lower layer (11), which studs (5) are evenly distributed over the bottom face (4), and in that the softening recesses (13) are made beyond the transverse space occupied by said one-piece studs (5).

10. Endless conveyor belt according to claim 1, characterized in that the lower layer (11) also comprises longitudinal recesses (15), oriented parallel to or at least substantially parallel to the longitudinal axis (A) of the body (2), which recesses (15) are made in the thickness of said lower layer (11) and open at said lower face (4) of the body (2), so as to reduce the resistance of said lower layer (11) to the transverse deformation in order to make it easier to place said conveyor belt (1) in tubular configuration.

11. Endless conveyor belt according to claim 2, characterized in that the softening recesses (13) extend into the whole thickness of the lower layer (11), and optionally over a portion of the thickness of the upper layer (10).

12. Endless conveyor belt according to claim 2, characterized in that the reinforcing members (6) are embedded in the thickness of the lower layer (11) and/or are situated at the interface between the upper layer (10) and lower layer (11).

13. Endless conveyor belt according to claim 2, characterized in that the softening recesses (13) extend beyond the space occupied by the reinforcing members (6).

14. Endless conveyor belt according to claim 2, characterized in that it comprises two groups of a plurality of parallel longitudinal reinforcing members (6), each being situated at ¼, or approximately ¼, of the width (L) of the body (2), relative to one of the edges (2') of said body (2), and in that the lower layer (11) comprises, over its length, a plurality of groups of three softening recesses: —one central softening recess (13a), situated between the two groups of longitudinal reinforcing members (6), and—two outer softening recesses (13b), extending between one of the groups of reinforcing members (6) and said body edge (2') nearby.

15. Endless conveyor belt according to claim 2, characterized in that the upper layer (10) comprises, on its lower face, two protruding one-piece lateral strips (10a), extending on either side of the lower layer (11), and in that the transverse softening recesses (13) extend beyond the space occupied by said lateral strips (10a) or only over a portion of their width.

16. Endless conveyor belt according to claim 2, characterized in that it comprises protruding studs (5) made in one piece in the lower layer (11), which studs (5) are evenly distributed over the bottom face (4), and in that the softening recesses (13) are made beyond the transverse space occupied by said one-piece studs (5).

17. Endless conveyor belt according to claim 2, characterized in that the lower layer (11) also comprises longitudinal recesses (15), oriented parallel to or at least substantially parallel to the longitudinal axis (A) of the body (2), which recesses (15) are made in the thickness of said lower layer (11) and open at said lower face (4) of the body (2), so as to reduce the resistance of said lower layer (11) to the transverse deformation in order to make it easier to place said conveyor belt (1) in tubular configuration.

18. Endless conveyor belt according to claim 1, further comprising:
plural sets of four studs (5) distributed along transverse lines (5') across the bottom face (4) of said body (2), each set of four studs (5) defining a first pair of studs (5) and a second pair of studs (5),
wherein with said body positioned in said tubular configuration, the studs (5) are located so that guiding wires (17) of the conveying device rest on sides of the studs (5) thereby preventing lateral movement of the endless belt when the conveying device moves the endless belt, and
wherein said reinforcing members (6) define first and second groups respectively in first and second zones in a width direction of said body (2), the first zone located on a first side of an axis of symmetry of the belt (2) and the second zone located on an opposite, second side of the axis of symmetry, and, with said body (2) in said tubular configuration, the first zone is located opposite the second zone, and the first zone is located between the first pair of studs (5) and the second zone located between the second pair of studs (5).

19. An endless conveyor belt and conveying device (18), comprising:
a driving and guiding means (17, 29, 30, 31) defining the conveying device, the driving and guiding means comprising longitudinal guiding wires (17);
a body (2) having a longitudinal axis of symmetry (A), a longitudinal length and a width (L), said body (2) being deformable transversely between a flat configuration, at rest, and a tubular configuration, said body (2) being in the tubular configuration
said body (2) being delimited by a top face (3) that receives product to be conveyed and a bottom face (4) that interacts with said driving and guiding means (17, 29, 30, 31) with said top face (3) and bottom face (4) being oriented respectively toward an inside and an outside of the conveyor belt (1) with said body (2) in said tubular configuration,
wherein plural sets of four studs (5) are distributed along transverse lines (5') across the bottom face (4) of said body, each set of four studs (5) defining a first pair of studs (5) and a second pair of studs (5), said body being positioned in said tubular configuration with the guiding wires (17) resting on sides of the studs (5) thereby preventing lateral movement of the endless belt when the driving and guiding means (17, 29, 30, 31) moves the endless belt,
wherein said body (2) comprises an upper layer (10) of a first elastomer material and forming said top face (3) superposed fixed to a lower layer (11) of a different, second elastomer mater and forming said bottom face (4), a portion of a lower surface of the upper layer (10) being is associated with the lower layer (11) forming said bottom face (4),
wherein a hardness of the first elastomer material is greater than a hardness of the second elastomer material with a coefficient of friction of said top face (3) being greater than a coefficient of friction of said bottom face (4);
a plurality of longitudinal reinforcing members (6) embedded in a thickness of said body, the plurality of longitudinal reinforcing members (6) limiting said body's ability to stretch longitudinally,
wherein said reinforcing members (6) define first and second groups respectively in first and second zones in a width direction of said body (2), the first zone located on a first side of the axis of symmetry and the second zone located on an opposite, second side of the axis of symmetry, and, with said body (2) in said tubular configuration, the first zone is located opposite the second zone, and the first zone is located between the first pair of studs (5) and the second zone located between the second pair of studs (5); and a plurality of softening recesses (13) extending transversely relative to the longitudinal axis of symmetry (A) of the body (2) of said conveyor belt (1) and distributed over a whole length of said lower layer (11), a plurality of softening recesses (13), each softening recess (13) extending over at least a portion of a thickness of said lower layer (11), the plurality of softening recesses (13) reducing a resistance of said lower layer (11) to longitudinal deformations, in tension and in compression, and thereby reducing a bending resistance of said body (2) in the tubular configuration.

* * * * *